Sept. 28, 1943.  R. I. SCHONITZER ET AL  2,330,245
CONNECTING AND GUIDING MEANS FOR ENDLESS TRACKS AND THE LIKE
Filed Feb. 14, 1942  3 Sheets-Sheet 1

INVENTORS:
RUDOLPH I. SCHONITZER
EDWIN L. ALLEN
HAROLD B. MUSTER
BY Hyde and Meyer
ATTORNEYS.

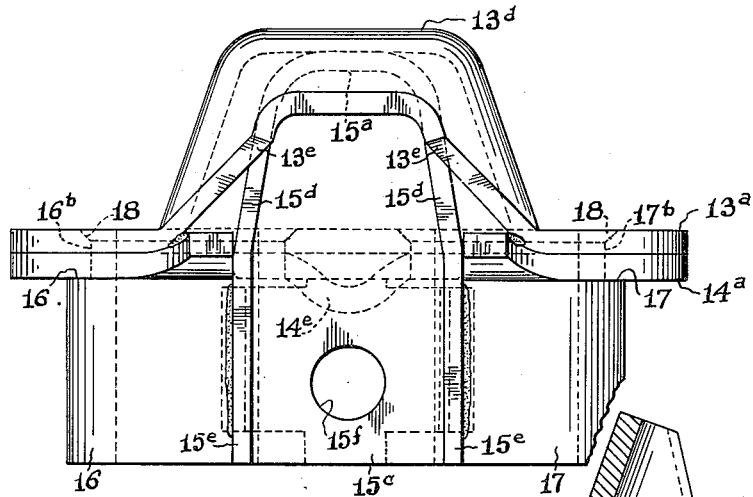
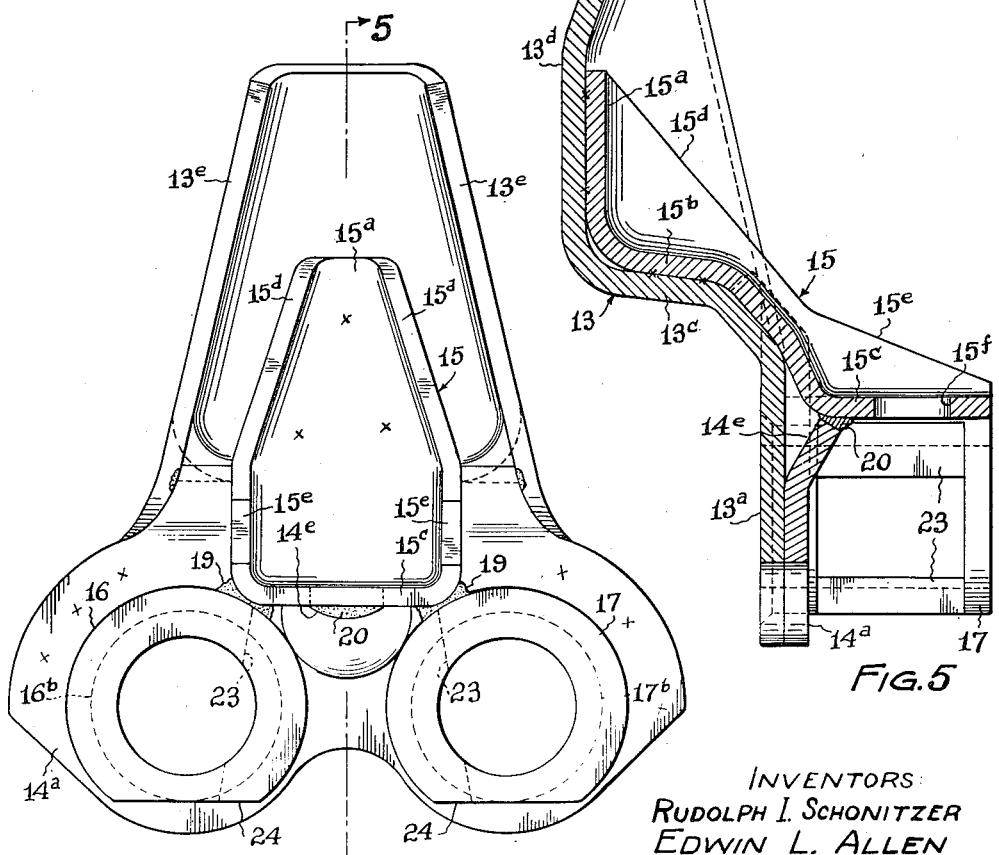
Fig. 3
Fig. 4
Fig. 5
INVENTORS:
RUDOLPH I. SCHONITZER
EDWIN L. ALLEN
HAROLD B. MUSTER
BY
Hyde and Meyer
ATTORNEYS.

Sept. 28, 1943.   R. I. SCHONITZER ET AL   2,330,245
CONNECTING AND GUIDING MEANS FOR ENDLESS TRACKS AND THE LIKE
Filed Feb. 14, 1942   3 Sheets-Sheet 3

INVENTORS:
RUDOLPH I. SCHONITZER
EDWIN L. ALLEN
HAROLD B. MUSTER
BY   Hyde and Meyer
ATTORNEYS.

Patented Sept. 28, 1943

2,330,245

UNITED STATES PATENT OFFICE 2,330,245

CONNECTING AND GUIDING MEANS FOR ENDLESS TRACKS AND THE LIKE

Rudolph I. Schonitzer, Shaker Heights, and Edwin L. Allen and Harold B. Muster, Cleveland Heights, Ohio; said Allen and said Muster assignors to said Schonitzer Application February 14, 1942, Serial No. 430,987

8 Claims. (Cl. 305—10)

This invention relates to an improvement in the construction of endless tracks having separate tread blocks, and relates to a combined end connector for adjacent tread-blocks and a track guide for retaining the track on bogie wheels and sprockets.

Track guides and end connectors are in use comprised of forgings but these have many disadvantages which are overcome by our improved devices. In the present improvement the parts are formed of metal stampings welded together where necessary and it results from our improvements that great uniformity is possible, little or no machining is necessary after assembly, and harder wearing surfaces are provided by the proper selection of the metal for the stampings and of the heat treatment to which they are submitted. It follows from this that our improved devices are less costly to produce, are suitable for mass production, and give more satisfactory results in use.

One of the objects of the present invention therefore is to provide a device of this sort which can be formed of sheet metal stampings and tubular members connected together by welding and provided with reinforcing flanges, ribs and projections and reinforcing plates where necessary or desirable so as to obtain all of the advantages pointed out in the preceding paragraph. The nature of our invention will be more clearly understood from the accompanying drawings and description and the essential features thereof will be set forth in the claims.

In the drawings,

Fig. 3 is an enlarged top plan view of the combined track guide and end connector shown in Figs. 1 and 2;

Fig. 4 is a front elevational view of the device of Fig. 3;

Fig. 5 is a sectional view of the same taken along the line 5—5 of Fig. 4;

Figure 8:
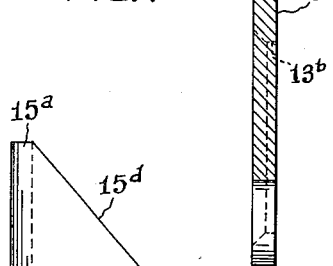
Figure 10:
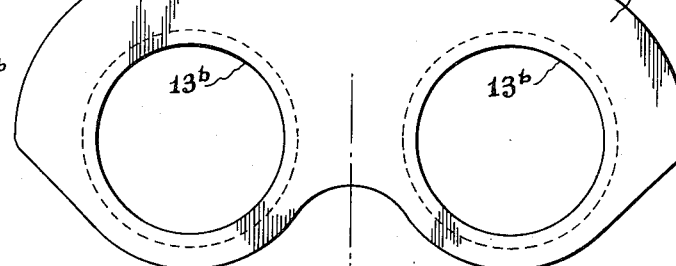
Figure 9:
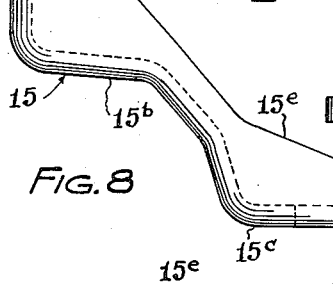
Figure 11:
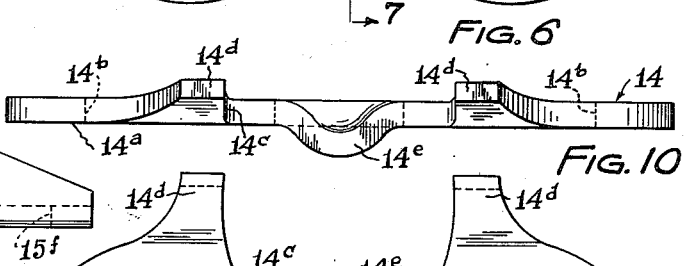

Figs. 8 and 9 are side and front elevational views respectively of one of the smaller stampings of the device shown in Figs. 3 to 5; and Figs. 10 and 11 are top plan and front elevational views respectively of another of the smaller stampings of Figs. 3, 4 and 5.

It will be understood by those skilled in this art that our device is applicable to that type of endless track used for tanks, tractors, trucks and the like which is composed of a plurality of separate tread blocks 10 united in link fashion to form the endless track. Such tread blocks are quite often formed of rubber in which are embedded crossbars 11, two to each block, the exposed ends of which serve as link pins for the end connectors. The blocks 10 are cut away as shown at 10a to permit them to pass around sprockets and guide wheels.

Figure 1:
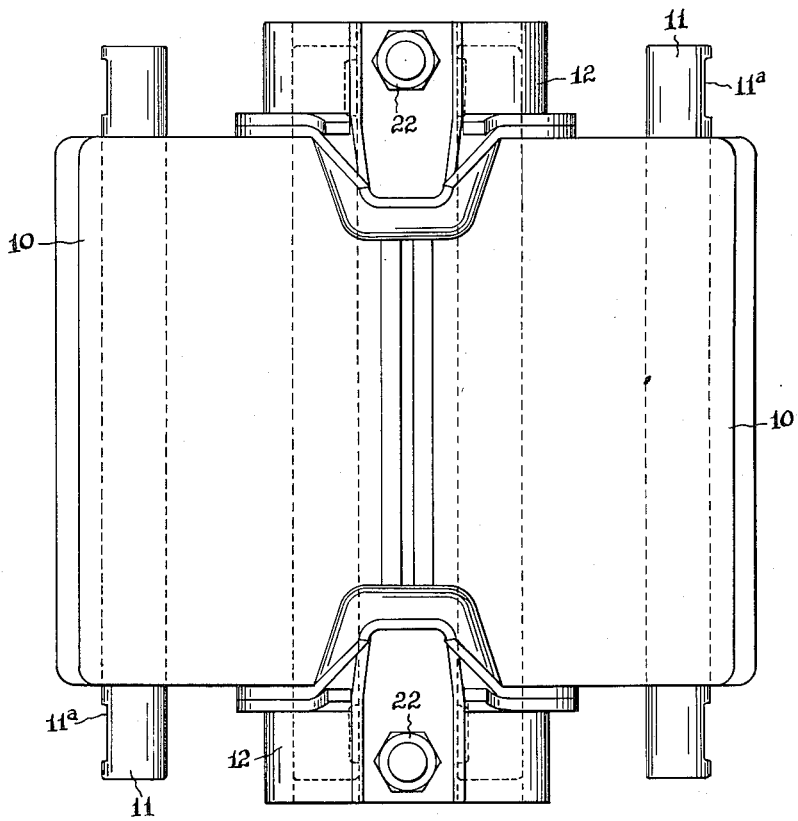
Fig. 1 is a plan view of a portion of an endless track equipped with our improved track guide and connector.
Figure 2:
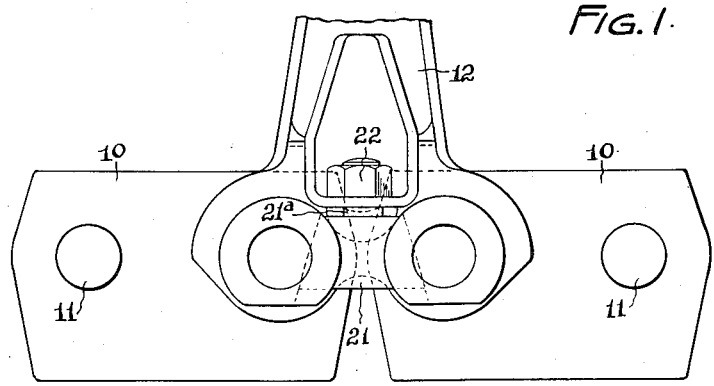
Fig. 2 is an end elevational view of the track of Fig. 1.

The present invention has to do with the combined end connector and track guide indicated at 12 in Figs. 1 and 2. This device has three functions, namely, it provides a connecting link between the crossbars of adjacent blocks so as to tie the blocks together into an endless track; it also is formed with an upstanding projection which prevents the track from slipping off the bogie wheels and sprockets; and thirdly, it provides a bearing surface for the sprockets which drive the track.

Figure 7:
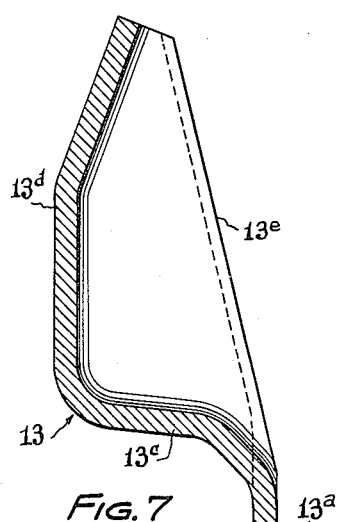
Fig. 7 is a sectional view taken along the line 7—7 of Fig. 6.
Figure 6:
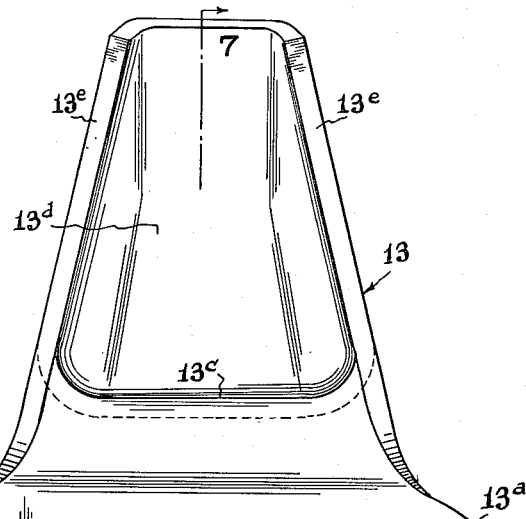
Fig. 6 is a front elevational view of the main stamping forming a part of the device of Figs. 3, 4 and 5.

This device 12 is here shown as comprising three stampings and two tubular members. The main stamping 13 as shown separately in Figs. 6 and 7 comprises a flat link portion 13a lying generally in a plane and having a pair of openings 13b adapted to embrace the crossbars 11 as will later appear. The metal of the stamping is then bent inwardly toward the center of the track as at 13c providing an offset portion substantially at right angles to the plane of the link portion 13a. The stamping then extends upwardly as at 13d in a direction opposite to the link portion 13a. This portion 13d provides a track guide which keeps the track from slipping off the bogie wheels or sprockets. The outer or free end of the track guide portion is flared back toward the plane of the link portion so as to give a smoother engagement with the wheels. The guide portion is strengthened by the side flanges 13e which extend from the free end of the guide portion down to the offset portion as far toward the outside as the plane of the link portion. The general effect is to provide a cupping of the upper portion of the stamping where the track guide is formed.

A second stamping 14 best seen in Figs. 10 and 11 provides a reinforcement for the link portion 13a. This stamping has a substantially plane portion 14a generally parallel to and welded to the link portion 13a. Openings 14b register with the openings 13b. The stamping is provided with a recess 14c to accommodate another reinforcing piece to be described. On each side of this recess tongues 14d extend upwardly and slightly inwardly as best seen in Figs. 3, 5 and 10. These tongues lie along the offset portion 13c and are welded thereto. This stamping has an outwardly flared lip 14e for a purpose later described.

Two tubular members 16 and 17 are secured to the members 13 and 14 in the openings 13b and 14b in a manner to extend at right angles to the link portion and to embrace the crossbars 11. These tubular members are of a somewhat thickened section provided with a shoulder as shown at 16a and 17a and a portion of smaller diameter 16b and 17b extending through the openings 14b and 13b, and preferably welded to the stampings 13 and 14. The inner ends of the tubular members are flared outwardly into the countersink 18.

A third stamping 15 generally of channel shape has its web at 15a generally parallel to the guide portion 13d. The web at 15b is generally parallel to the offset portion 13c and the web at 15c forms a tie between the tubular members 16 and 17, being welded thereto at the points 19. The web at 15a and 15b is spot or projection welded to the parallel surfaces of the stamping 13. The flanges 15d of the stamping 15 extend generally parallel to the flanges 13e and provide maximum reinforcement for the track guide portion of the main stamping. At 15e these flanges are generally parallel to the crossbars 11 and provide reinforcement for the overhanging parts of the tubular members 16 and 17. It will be noted that the lip 14e underlies and supports the outer end of the stamping 15 and is preferably welded thereto at the point 20. The stamping 15 has a hole 15f to receive a lock bolt as will presently appear.

Referring to Figs. 1 and 2, it will be noted that the crossbars are notched at 11a to receive a locking member 21 which has a central upstanding stud 21a passing upwardly through the opening 15f and secured in place by a nut 22. The tubular members 16 and 17 have milled slots 23 which register with the notches 11a so as to receive the locking member.

The tubular members are flatted at 24 for the attachment of a grouser.

It will be understood that the tubular members 16 and 17 are engaged by the driving sprockets and therefore provide wearing surfaces protecting the crossbars at these points.

What we claim is:

1. In the combination of an endless track composed of tread blocks having link pin crossbars and wherein the track travels over sprocket or bogie wheels, a combined crossbar connector and track guide comprising a metal plate member having a link portion adapted to connect crossbars of adjacent tread blocks, said member having an offset portion formed by bending said plate member inwardly and then upwardly in a direction opposite to said link portion, and a reinforcing plate member of channel form having a web generally parallel to said first named plate member where said offset portion is bent, said plate members being welded together.

2. In the combination of an endless track composed of tread blocks having link pin crossbars and wherein the track travels over sprocket or bogie wheels, a combined crossbar connector and track guide comprising a metal plate member having a link portion adapted to connect crossbars of adjacent tread blocks, said member having an offset portion formed by bending said plate member inwardly, said plate member being then bent upwardly in a direction opposite to said link portion to form a track guide portion, and a reinforcing plate member extending along said offset and guide portions and welded to said first named plate member.

3. In the combination of an endless track composed of tread blocks having link pin crossbars and wherein the track travels over sprocket or bogie wheels, a combined crossbar connector and track guide comprising a metal plate member having a link portion adapted to connect crossbars of adjacent tread blocks, said member having an offset portion formed by bending said plate member inwardly, said plate member being then bent upwardly in a direction opposite to said link portion to form a track guide portion, and a reinforcing plate member extending along said offset and guide portions and welded to said first named plate member, said reinforcing plate member being of channel form and having flanges extending generally parallel to said crossbars.

4. In the combination of an endless track composed of tread blocks having link pin crossbars and wherein the track travels over sprocket or bogie wheels, a combined crossbar connector and track guide comprising a metal plate member having a link portion adapted to connect crossbars of adjacent tread blocks, said member having an offset portion formed by bending said plate member inwardly and then upwardly in a direction opposite to said link portion, means adapted to embrace said crossbars extending from said link portion in a direction opposite to said offset portion, and a reinforcing plate member welded to said offset portion, said reinforcing member extending along said last named means and being welded thereto.

5. In the combination of an endless track composed of tread blocks having link pin crossbars and wherein the track travels over sprocket or bogie wheels, a combined crossbar connector and track guide comprising a metal plate member having a link portion adapted to connect crossbars of adjacent tread blocks, said member having an offset portion formed by bending said plate member inwardly and then upwardly in a direction opposite to said link portion, means adapted to embrace said crossbars extending from said link portion in a direction opposite to said offset portion, and a reinforcing member of channel form welded to said offset portion and extending along said last named means and welded thereto, said reinforcing member having flanges generally parallel to said crossbars.

6. In the combination of an endless track composed of tread blocks having link pin crossbars and wherein the track travels over sprocket or bogie wheels, a combined crossbar connector and track guide comprising a metal plate member having a link portion adapted to connect crossbars of adjacent tread blocks, said member having an offset portion formed by bending said plate member inwardly and then upwardly in a direction opposite to said link portion, tubular members rigidly secured to and extending from said link portion in a direction opposite to said offset portion, said tubular members being adapted to embrace said crossbars, and a reinforcing plate member welded to said offset portion and extending between and secured to said tubular members.

7. The combination of claim 6 including a plate member generally parallel to and welded to said link portion.

8. The combination of claim 6 including a plate member generally parallel to and welded to said link portion, and said last named plate member having a portion engaging and supporting said reinforcing plate member.

RUDOLPH I. SCHONITZER.
EDWIN L. ALLEN.
HAROLD B. MUSTER.